United States Patent [19]

Charlebois et al.

[11] 4,255,609

[45] Mar. 10, 1981

[54] TELECOMMUNICATIONS CABLE WITH GROUNDING INSTALLATIONS AT SPACED INTERVALS AND METHOD OF MAKING SAME

[75] Inventors: Leonard J. Charlebois, Kanata; James K. Kho, Nepean, both of Canada

[73] Assignee: Northern Telecom Limited, Montreal, Canada

[21] Appl. No.: 104,884

[22] Filed: Dec. 18, 1979

[51] Int. Cl.³ .................... H02G 7/10; H01B 7/18; H01R 4/66
[52] U.S. Cl. ............................... 174/41; 29/858; 174/6; 174/72 R; 174/78
[58] Field of Search ............... 174/6, 41, 72 R, 76, 174/78; 339/14 L, 198 E, 218 R, 218 C, 218 M, 248 R, 248 S; 403/305; 29/857, 858, 868

[56] References Cited

U.S. PATENT DOCUMENTS

| 1,958,196 | 5/1934 | Lundy et al. | 339/218 R |
| 2,064,440 | 12/1936 | Meeker | 403/305 X |
| 2,344,635 | 3/1944 | Priestley | 174/72 R X |
| 2,434,102 | 1/1948 | Channell | 174/41 X |

FOREIGN PATENT DOCUMENTS

| 491934 | 1/1977 | Australia | 174/72 R |
| 572270 | 1/1976 | Switzerland | 174/6 |

Primary Examiner—Laramie E. Askin
Attorney, Agent, or Firm—R. J. Austin

[57] ABSTRACT

A telecommunications cable provided with an electrically conductive adaptor for grounding purposes. The adaptor is factory fitted to the cable shield and an electrically insulating encapsulation extends around the adaptor and cable in the vicinity of the adaptor while rendering the adaptor accessible from outside for connection of a grounding extension. In practice, a cable is provided with a plurality of spaced adaptors along its length. Field splicing is eliminated with use of the construction for aerial cable and aerial installation is simplified and made cheaper.

10 Claims, 5 Drawing Figures

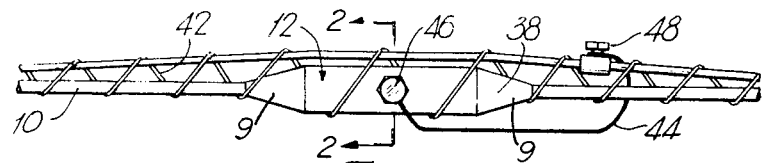
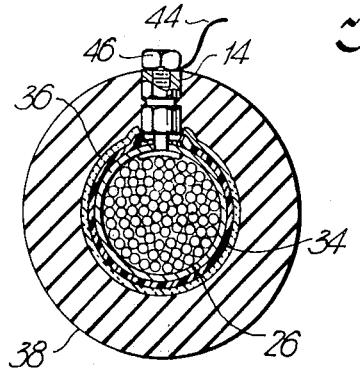
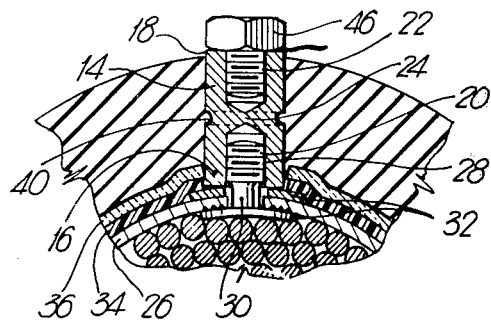
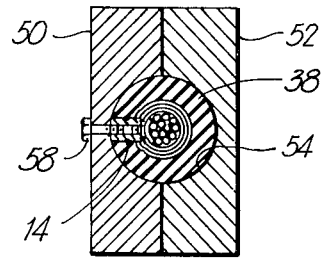
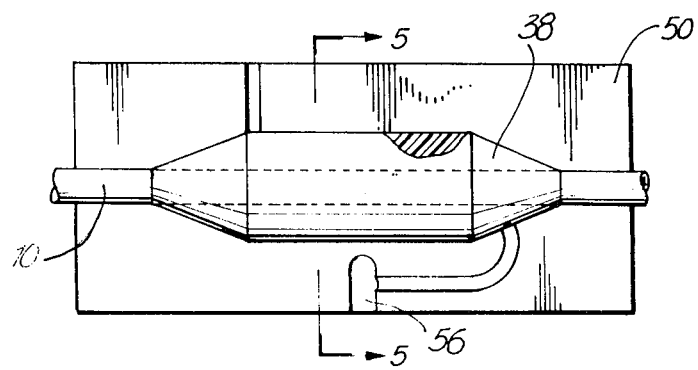

TELECOMMUNICATIONS CABLE WITH GROUNDING INSTALLATIONS AT SPACED INTERVALS AND METHOD OF MAKING SAME

This invention relates to the grounding of aerially located telecommunications cable.

Conventionally, telecommunications cable is carried above ground by being suspended from a suspension strand. The cable is suspended primarily by a cable lashing which extends along cable and strand while being passed around them. It is necessary to install at intervals of around 150 to 300 meters, grounding connections from an electrically conductive shield of the cable to the suspension strand which is also conductive. The installation of grounding connections complicates the procedure of suspending the cable in that in every position chosen to install a grounding connection, the cable lashing needs to be cut to terminate the lashing and then restarted a short distance further along the cable to provide a lashing-free gap. At each end of a cut length of cable lashing, cable lashing clamps are fitted to the suspension strand to hold the lashing, and cable supports and spacers are required at each side of the gap to ensure that the cable is held securely to the strand across the gap. The installer then has to cut into the sheath and shield of the cable to fit an electrically conductive clamp to the shield and a grounding extension or wire from the clamp to a ground clamp fixed to the strand. He then needs to complete each grounding operation by making a water-tight encapsulation at the cut region of the sheath and shield. This is done by the use of wrapping sealing tape along the cable at the gap and by employing sealing cement.

It will be appreciated that the entire operation of suspending a cable and grounding it at intervals is lengthy and tedious and is also difficult to perform when the strand and cable are being strung in aerial fashion upon poles. Also, because of the difficulty caused by the working conditions which may be increased by adverse weather conditions, the suspension and grounding procedure may be undesirably slow and the operability and efficiency of the groundings are sometimes unreliable.

It would be particularly advantageous to devise some method by which the cable suspension procedure was simplified while increasing the reliability of cable shield groundings.

According to one aspect of the present invention, a telecommunications cable has an electrically conductive shield surrounding a cable core, and grounding installations at spaced intervals along the cable, each installation comprising an electrically conductive adaptor extending radially outwardly from the cable and electrically connected to the shield, and an electrically insulating encapsulation which encapsulates the adaptor and the cable on each side of the adaptor while rendering the adaptor accessible from the outside of the encapsulation for connecting a grounding extension to the adaptor.

The cable according to the invention is performed at spaced positions along its length with the grounding installations. Hence, this immediately eliminates the need for field splicing during installation of aerial cable. Further, the need for gaps in cable lashing is avoided as the installer no longer requires cable lashing-free regions in which to open the cable. Hence, the cable lashing need not be cut but may extend continuously along and around the cable and each grounding installation. It follows that cable lashing clamps and cable supports and spacers are no longer required.

As a result, the preformed grounding installations minimize the difficulties of installing aerial cable in the field as only the step of connecting a grounding extension from the adaptor to the suspension strand is necessary. This gives saving in cost by elimination of parts conventionally necessary and because of a speeding up of the cable installation procedure, labour costs are also reduced. Where the encapsulation is molded from plastic material, this is a particularly economic and effective manner of forming it.

The invention also includes a telecommunications cable according to the invention as defined above and which is aerially suspended from an electrically conductive suspension strand, the shield of the cable being electrically connected to the suspension strand by grounding extensions from the adaptors, and the cable being suspended from the strand by a cable lashing passing around and along the cable and the encapsulations.

The invention further includes an electrically conductive adaptor for grounding an electrically conductive shield of a telecommunications cable, the adaptor having two ends each provided with screw threaded means, one for connection to an electrically conductive shield clamp and the other for connection to a grounding extension, the adaptor also having, between its ends, retaining means to hold it securely within an encapsulation.

Also according to the invention, there is provided a method of providing a grounding installation on a telecommunications cable comprising disposing an electrically conductive adaptor on the outside of a cable to extend radially outwardly therefrom while being electrically connected to an electrically conductive shield of the cable, and encapsulating the adaptor and the cable with electrically insulating encapsulation which encapsulates the adaptor and part of the cable extending on each side of the adaptor while rendering he adaptor accessible from the outside of the encapsulation for connecting a grounding extension to the adaptor.

One embodiment of the invention will now be described, by way of example, with reference to the accompanying drawings, in which:

FIG. 1 is a side elevational view of a telecommunications cable aerially suspended from a suspension strand;

FIG. 2 is a cross-sectional view of the cable taken along line 2—2 in FIG. 1 and on a larger scale;

FIG. 3 is a scrap sectional view of part of the the cable, also along line 2—2 and on a scale larger than FIG. 2;

FIG. 4 is a longitudinal cross-sectional view through a mould showing the moulding of an encapsulation on the cable; and FIG. 5 is a cross-sectional view of the mould taken along line 5—5, in FIG. 4 and before moulding of the encapsulation.

As shown in FIG. 1 of the drawings, a telecommunications cable 10 has grounding installations 12 (one only being shown) at spaced intervals along the cable.

As shown particularly by FIGS. 2 and 3, each grounding installation comprises an electrically conductive adaptor 14 of short bar-shape and extending radially outwardly from the cable. The adaptor has inner and outer ends 16, 18 each of which has screw-threaded means in the form of an axially extending female thread 20 or 22 formed along blind holes which are purposely separated by a web 24 to prevent flow of moisture from end to end. The inner end 16 of the adaptor is electrically connected to electrically conductive shield 26 of cable by a stud 28 of a shield clamp 30 which is received within the screw thread 20. The clamp is of conventional construction and as shown by FIG. 3 comprises opposing jaws 32 with confronting teeth. The clamp is held securely to the shield by the stud being screwed into the adaptor and drawing the jaws together.

The cable has an outer surrounding polyethylene sheath 34 through which the clamp passes to reach the shield. In the immediate axial region of the adaptor and clamp, the cable has a protective wrapping of heat resistant tape 36 which is glass tape, half-lapped from one convolution to the next. An electrically insulating encapsulation 38 encapsulates the adaptor and the cable for a distance along the cable on each side of the adaptor as shown in FIG. 1. The encapsulation, roughly circular in cross-section with tapered ends 9, is moulded from a material which is compatible with the polyethylene sheath so as to adhere to it and provide a moisture proof seal. Such a material may be an ethylene acrylic acid or an ionomer resin such as Surlyn (Registered Trade Mark).

As may be seen from FIGS. 2 and 3, the adaptor has its outer end 18 exposed so as to be accessible from the outside of the encapsulation. To render the adaptor immovable within the encapsulation, it has retaining means. The retaining means comprises the surfaces of a groove 40 which is circumferentially extending around the adaptor and is preferably annular as in the embodiment. This groove is filled with encapsulation material during moulding and prevents extraction of the adaptor. To prevent rotation of the adaptor, it has at least one flat side extending along its length. For convenience of manufacture and to make the adaptor multi-faceted, it is formed from hexagonal bar.

FIG. 1 illustrates how the cable with its preformed grounding installations is aerially suspended from an electrically conductive suspension strand. The cable is suspended simply by wrapping a cable lashing 42 in continuous fashion along the cable while wrapping it around the cable and around the strand. The cable wrapping thus extends also around and along the grounding installations as shown by FIG. 1. It is a simple matter for each adaptor to be connected by a ground extension or wire 44 so as to ground the cable shield. This is quickly and effectively done by securing one end of the ground extension to the adaptor by a holding bolt 46 received in the screw thread 22 at the outer end 18 of the adaptor, the other end being secured in conventional manner to a ground clamp 48 mounted upon the suspension strand.

As may be seen from the above description, the preformed grounding installations while allowing for quick and effective connection to the suspension strand, do not require gaps to be provided along the cable lashing because field installation does not include operating and closing the cable and wrapping it in insulation. In consequence, the cable lashing clamps and cable supports and spacers are not required thus saving in materials and in labour. Apart from the reliability of the grounding installations as described in the embodiment, they also lead therefore to financial savings.

In the manufacture of the cable, at each position in which a grounding installation is required, the cable outer surface is cleaned in the area and the sheath and shield are slit along a distance sufficient for the passage of a clamp 30. After insertion of the clamp into the cable with its jaws 32 on each side of the shield, the adaptor is screwed onto stud 28 and the jaws are drawn together positively to clamp onto the shield. After wrapping the glass tape around the cable so as to seal the area of the slit, the cable is placed in a mould as shown in FIGS. 4 and 5.

The mould comprises two mould halves 50, 52 which as shown in FIG. 5 seal onto the outside of the cable on each side of the area designated for a grounding installation while defining a mould cavity 54 for the encapsulation. As shown in FIG. 5, the outer end of the adaptor is held against a part of the mould surface of mould half 50 to prevent the plastic material of the encapsulation from covering the outer end. Abutment of the adaptor is created by a bolt 58 passing through a hole in the mould half and being screwed into the screw thread 22 of the adaptor. This securing action also holds the cable in a fixed position, i.e. centralized within the mould and resists any tendency for it to move towards a wall of the cavity during moulding.

The encapsulation is then moulded by an extrusion or injection moulding technique by passing the hot melt adhesive, an ethylene acrylic acid or an inonomer resin through an injection runner 56 and into the cavity. The adhesive may be injected or extruded into the cavity at a melt temperature of around 180° C. The highest temperature which has been recorded upon a cable surface during moulding is within the region from 120°–150° C. With a cable having 50 pairs or 100 pairs of conductors in the core, temperatures up to 90° C in the outer regions of the core have been recorded during moulding. These temperatures are not harmful to the core and the temperatures quickly drop through heat dissipation.

After the encapsulation has cooled, the cable is removed from the mould.

What is claimed is:

1. A telecommunications cable with an electrically conductive shield surrounding a cable core, and grounding installations at spaced intervals along the cable, each grounding installation comprising:
   (a) an electrically conductive shield clamp comprising opposing jaws, one on the inside and the other on the outside of the shield;
   (b) an electrically conductive adaptor extending outwardly of the cable from the jaws and having an inner end and an outer end each formed with a screw thread;
   (c) a screw threaded clamp stud in screw threaded and electrically conductive engagement with the inner end of the adaptor to hold the jaws securely clamped to the shield and electrically connected to the adaptor;
   (d) an electrically insulating encapsulation which encapsulates the adaptor and the cable axially on each side of the adaptor with the outer end of the adaptor accessible from the outside of the encapsulation for connecting a grounding extension to the adaptor; and
   (e) the adaptor of each installation having retaining means to hold it securely and against rotation in the encapsulation and the encapsulations of the installations being spaced-apart along the cable at the installation positions.

2. A cable according to claim 1 wherein the encapsulation is a moulded encapsulation of plastic material.

3. A cable according to claim 2 wherein the cable has a protective wrapping of heat resistant tape underneath the encapsulation in the region of the conductive adaptor.

4. A cable according to claim 1 wherein the adaptor is of bar-shape and has a circumferentially extending groove lying between its ends, the retaining means comprising surfaces of the groove and at least one flat side formed in the bar shape.

5. A cable according to claim 4 wherein the adaptor is multi-faceted from end-to-end and the groove is annular.

6. An assembly of a telecommunications cable and an electrically conductive suspension strand wherein the cable is according to claim 1, the assembly comprising a cable lashing passing around and along the strand, the cable and the grounding installations to aerially suspend the cable from the strand, and grounding extensions held to the outer ends of the adaptors by screw threaded means and also secured to the suspension strand.

7. A method of providing grounding installation at spaced intervals along a telecommunications cable having an electrically conductive shield surrounding the cable core, the method comprising:
providing an electrically conductive adaptor which has an inner end and an outer end each formed with a screw thread and a retaining means to hold it securely against rotation in an electrically insulating encapsulation to be applied as part of the installation;
disposing opposing jaws of an electrically conductive shield clamp one on the inside and the other on the outside of the shield;
locating the adaptor to extend outwardly of the cable from the jaws and securing a screw threaded clamp stud in screw threaded and electrically conductive engagement with the inner end of the adaptor to hold the jaws securely clamped to the shield and electrically connected to the adaptor; and
encapsulating the adaptor and the cable axially on each side of the adaptor in the encapsulation while rendering the outer end of the adaptor accessible from the outside of the encapsulation for connecting a grounding extension to the adaptor, the retaining means of the adaptor serving to hold it securely and against rotation in the encapsulation, and the encapsulations of the installations being spaced-apart along the cable.

8. A method according to claim 7 comprising forming the encapsulation by disposing the part of the cable carrying the adaptor and said part of the cable on each side of the adaptor, in a mould chamber, and moulding the encapsulation in the mould with plastic material while preventing the plastic material from covering part of the adaptor which is required to be accessible from the outside of the encapsulation.

9. A method according to claim 8 comprising securing said part of the adaptor in abutting engagement with a surface of the mold by passing a screw-threaded means through the mould and screwing said means to the adaptor, said abutting engagement preventing the plastic material from covering said part of the adaptor.

10. A method according to claim 8 comprising wrapping said parts of the cable with a protective wrapping of heat resistant tape before moulding the encapsulation.

* * * * *